United States Patent
Albertson

[15] 3,675,500
[45] July 11, 1972

[54] STEPWISE MOVABLE V-BELT DRIVE PULLEY

[72] Inventor: Robert V. Albertson, 2100 Shady Wood Road, Minneapolis, Minn.

[22] Filed: Nov. 4, 1970

[21] Appl. No.: 86,848

[52] U.S. Cl. ................................................74/230.17 E
[51] Int. Cl. ........................................................F16h 55/52
[58] Field of Search ................................................74/230.17 E

[56] References Cited

UNITED STATES PATENTS 3,266,330   8/1966   Galleher ........................74/230.17 E

FOREIGN PATENTS OR APPLICATIONS 552,939   2/1958   Canada ............................74/230.17 E
724,395   12/1965   Canada ............................74/230.17 E

*Primary Examiner*—C. J. Husar
*Attorney*—Alfred E. Hall

[57] ABSTRACT

A V-belt drive pulley transmission having a pulley with a fixed flange and an axially movable flange cooperating to form a variable diameter pulley for effecting a change in the "gear ratio" of the transmission. The displacement of the axially movable flange is a function of the rotational speed of the pulley. Further, a multi-step detent device comprising a spring biased pivotally mounted lever with detents therein is disposed between the fixed and the axially movable flange so that the displacement of the movable flange occurs in discrete steps to produce a "shifting" effect between low gear and high gear.

6 Claims, 1 Drawing Figure

PATENTED JUL 11 1972 3,675,500
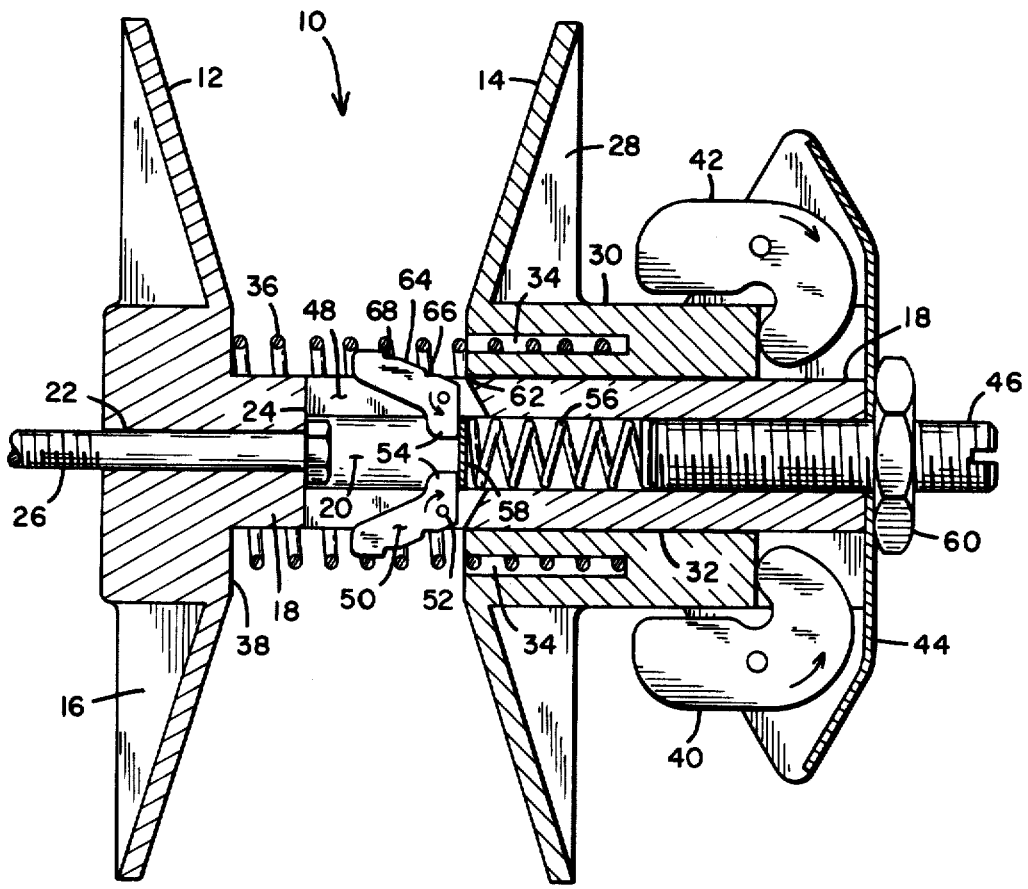
INVENTOR
ROBERT V. ALBERTSON
BY *Alfred E Hall*
ATTORNEY

STEPWISE MOVABLE V-BELT DRIVE PULLEY

BACKGROUND OF THE INVENTION

This invention relates generally to a transmission system for a motor driven vehicle, and more specifically to the design of a drive pulley utilized in such a transmission system.

In V-belt drive transmission systems, there is generally a driving pulley and a driven pulley each with a movable and a fixed flange. As the axially movable flange is displaced with respect to the fixed flange, the diameter of the pulley is varied. Further, in prior art systems, means are provided for controlling the amount of displacement between the fixed flange and the movable flange as a function of the rotational velocity of the pulley.

A better understanding of the type of prior art transmission system referred to above can be obtained from my co-pending patent application, Ser. No. 36,776 filed May 13, 1970 and entitled TRANSMISSION BELT-DRIVE SYSTEM. As is explained in that application, the variable speed drive pulley is obtained by including a set of cams which cooperate with the axially movable flange. Centrifugal force acting upon these cams applies an axial force tending to move the axially movable flange toward the fixed flange to thereby increase the effective diameter of the pulley as a function of its rotational velocity. Of course, as the diameter of the drive pulley changes with respect to the diameter of the driven pulley, the "gear" ratio of the transmission changes. When a vehicle incorporating the type of drive system considered herein starts up, the movable flange is displaced from the fixed flange on the drive and just the opposite is true with respect to the driven pulley. Thus, the transmission can be considered to be in low gear since many revolutions of the drive pulley are required to produce one revolution of the driven pulley. As the speed of the drive pulley increases such that centrifugal force acts upon the cams, the movable flange is urged toward the fixed flange to thereby increase the effective diameter of the drive pulley. When the drive pulley is at maximum speed, the movable flange will abut the fixed flange and the diameter of the pulley will be at a maximum corresponding to high gear.

It is to be noted that in the system considered above, that the displacement of the axially movable flange with respect to the fixed flange is a linear function of the speed of the drive pulley. As a result, the vehicle transmission moves from low gear to high gear in a continuous fashion. On the other hand, in transmission systems wherein gears are employed, shifting from low gear to high gear involves a stepwise variation in the speed of the vehicle. In both manual and automatic automobile transmissions, one will notice discrete changes in engine speed as the transmission changes from low gear to second and from second gear to high. It has been determined that many operators of vehicles incorporating V-belt drive systems would prefer that shifting be accomplished in discrete steps to simulate a gear box type transmission. The present invention is designed to achieve this result.

To produce the "feel" of a gear type transmission in a vehicle employing a V-belt type transmission, I employ a detent mechanism disposed between the axially movable flange and the fixed flange of the drive pulley. As the rotational velocity of the drive pulley increases causing the movable flange to move toward the fixed flange, a movable flange encounters the detent which temporarily prevents further axial movement of the movable flange until a predetermined rotational velocity is exceeded. Once exceeded, the movable flange moves only a predetermined distance toward the fixed flange until it encounters another step in the detent. Again, before any further movement of the movable flange can take place, a second value of rotational velocity must be exceeded. Thus, the detent mechanism allows the V-belt drive to shift from low gear to high gear in a predetermined number of discrete steps rather than in a continuous fashion as in prior art systems.

Accordingly, it is a primary object of the present invention to provide an improved V-belt transmission system of the variable speed type wherein the diameter of the drive pulley is increased in discrete steps as the rotational velocity of the pulley is increased.

Another object of this invention is to provide a V-belt transmission system that simulates or produces the "feel" of a gear-type transmission.

Still another object of the invention is to provide a drive pulley for a variable speed V-belt transmission system wherein a detent mechanism is disposed between the fixed and axially movable flange such that that movable flange is permitted to move toward the fixed flange in a predetermined number of discrete steps as the rotational velocity of the drive pulley is increased.

BRIEF DESCRIPTION OF THE DRAWINGS

These and other more detailed and specific objects will be disclosed in the course of the following specification, reference being had to the accompanying drawing in which is illustrated a cross-sectional view of the drive pulley incorporating the present invention.

DESCRIPTION OF THE PREFERRED EMBODIMENT

Referring now to the drawing, there is shown a drive pulley suitable for use in a variable-speed V-belt transmission system. The drive pulley is indicated generally by numeral 10. The drive pulley includes a fixed flange member 12 and an axially movable flange member 14. The fixed flange 12 includes a flange portion 16 which is in the shape of a frustrum of a cone which is integrally formed with a cylindrical shaft 18, coaxial with the frustro-conical section 16. Extending through the shaft 18 is a bore 20 and a bore 22. Bore 20 is of slightly larger diameter than bore 22 such that a shoulder 24 exists at the juncture of these two bores. A bolt 26 passes through the bore 22 and the head of this bolt abuts the shoulder 24. The bolt 26 is adapted to secure the fixed flange 12 to the drive shaft of the transmission. The movable flange 14 can also be considered as being comprised of two portions, namely, the frustro-conically shaped flange portion 28 and the sleeve portion 30 formed integrally therewith. An axial bore 32 is drilled or otherwise machined through the sleeve 30 and is of a diameter slightly larger than the outside diameter of the shaft 18 of the fixed flange member 12. Thus, the movable flange member 14 is free to slide in an axial direction about the shaft 18. A suitable spline or key (not shown) is provided between the shaft 18 and the shaft 30 to prevent rotation of the movable flange 14 about the shaft of the fixed flange 12.

Formed within the sleeve portion 30 of the movable flange 14 is a circumferential groove 34. A spring member 36 is disposed about the shaft 18 and abuts the surface 38 of the fixed flange 12. When the parts are assembled as illustrated, the spring member 36 fits into the circumferential groove 34 and abuts the bottom of this groove. The spring 36 normally serves to urge the axially movable flange 14 away from the fixed flange 12.

As is more fully described in the aforereferenced copending application, the drive pulley can include the means for moving the movable flange 14 toward the fixed flange 12 as the rotational velocity of the pulley is increased. As in that co-pending application, the present invention incorporates a plurality of cams 40 and 42 which are pivotally mounted in an end cap 44. The end cap 44 is secured to the shaft 18 by a screw 46 which fits into the threads formed on the inside surface of the bore 20 in sleeve 18. As the rotational speed of the drive pulley 10 is increased, centrifugal force causes the cam members 40 and 42 to rotate in the direction shown by the small arrows thereon to thereby urge the movable flange 14 toward the fixed flange 12 against the force produced by the springs 36.

Formed within the shaft 18 are pair of slots 48. Pivotally mounted within the slots 48 is a pair of detent levers 50. Pins 52 serve to hold the detent levers 50 in place in the slots 48 and also provide the pivot about which the levers 50 are free to rotate.

When in place and with the movable flange 14 in the position illustrated, the levers 50 have a portion 54 extending into the bore 20. A spring 56 is located within the bore 20 and abuts at one end, the end of bolt 46 and at the other end a plate or slug 58. The tension of the spring 56 is adjustable by positioning the screw 46 and the stop nut 60. Thus, the spring urges the slug 58 against the depending portion 54 of detent levers 50 to normally maintain the levers in the position illustrated in the drawing.

As the rotational speed of the pulley 10 is increased and the cams 40 and 42 urge the movable flange member 14 towards the fixed flange member 12, the shoulder 62 of the movable flange member 14 will engage the inclined portion 64 of detent lever 50 and will tend to rotate the levers 50 in the direction indicated by the small arrows thereon. The movable flange 14 will continue to move to the left in a linear fashion as the rotational speed of the pulley is increased until the shoulder 62 engages the first notch 66 formed in the detent lever 50. The notch 66 constitutes a discontinuity in the inclined portion 64 of the detent lever and the movement of the movable flange 14 toward the fixed flange 12 will be arrested until such time that the force applied by way of the cams 40 and 42 is sufficient to overcome the resistance afforded by the notch 66. At the time that this resistance is overcome, the movable flange 14 will continue to move toward the left until the shoulder 62 engages the next notch 68. Again, the rotational velocity of the pulley 10 will have to increase by a discrete amount before the shoulder 62 will slip out of the notch 68 to thereby allow the movable flange to assume its closed position with respect to the fixed flange 12.

By providing the spring biased detent levers 50 continuous motion of the movable flange is interrupted at predetermined intervals until the rotational velocity of the pulley exceeds a given threshold. Thus, the speed of the vehicle employing this transmission will increase from a standstill to a first velocity in a relatively linear fashion, will stay at this first predetermined velocity for a moment and then will increase to a second predetermined velocity where it will again remain constant for a period. After this second period, the vehicle will again increase in velocity until the movable flange 14 has assumed its closed position with respect to the fixed flange 12.

From the foregoing, it can be seen that the addition of the detent levers 50 in the variable speed V-belt drive pulley arrangement will produce or simulate the shifting of gears of a conventional gear box type transmission.

It is understood that suitable modifications may be made in the structure as disclosed provided such modifications come within the spirit and scope of the appended claims.

Having now, therefore, fully illustrated and described my invention, what I claim to be new and desire to protect by Letters Patent is:

1. A variable speed V-belt pulley assembly comprising;
   a. a fixed flange adapted to be connected to a motor shaft;
   b. a movable flange slidably coupled to said fixed flange;
   c. means responsive to centrifugal forces for moving said movable flange toward said fixed flange as the rotational velocity of said pulley assembly increases and;
   d. a spring biased pivotally mounted lever having detent means therein disposed between said fixed flange and said movable flange for allowing said movable flange to move toward said fixed flange in one or more discrete steps by restraining said movable flange in each of said detents until centrifugal forces overcome said spring bias.

2. A variable speed V-belt drive pulley assembly comprising:
   a. a fixed flange having a shaft extending therefrom;
   b. a movable flange having a sleeve portion formed integrally therewith, said sleeve portion having an axial bore of a greater internal dimension than the diameter of said shaft;
   c. means coupling said shaft within said axial bore such that said fixed and movable flange rotate in unison and are axially displaceable with respect to one another;
   d. biasing means disposed between said fixed and movable flange for urging said fixed and movable flanges apart;
   e. means responsive to centrifugal force coupled to said shaft and operatively associated with said movable flange for urging said movable flange toward said fixed flange as the rotational speed of said pulley assembly is increased; and
   f. a spring biased lever having detent means therein pivotally mounted on said shaft between said fixed and movable flanges for permitting said movable flange to move toward said fixed flange in discrete steps by restraining said movable flange in each of said detents until centrifugal forces overcome said spring bias.

3. Aparatus as in claim 2 wherein said shaft has an axial bore formed therein.

4. Aparatus as in claim 3 wherein said spring bias for said lever comprises:
   a. means for pivotally mounting said lever in slots formed in said shaft, said lever having a first portion extending into said axial bore in said shaft and a second portion normally extending outwardly from said shaft; and
   b. a spring located within said axial bore in said shaft cooperating with said first portion of said lever for yieldably urging said second portion outward from said shaft to engage said movable flange as it moves toward said fixed flange.

5. Aparatus as in claim 4 wherein said second portion of said lever is notched.

6. Apparatus as in claim 4 and further including means for adjusting the tension of said spring.

* * * * *